US009495692B2

(12) United States Patent
Tung et al.

(10) Patent No.: US 9,495,692 B2
(45) Date of Patent: Nov. 15, 2016

(54) CONVERSION AND DISPLAY OF A USER INPUT

(71) Applicant: Tung Inc., Los Angeles, CA (US)

(72) Inventors: Mark Tung, Los Angeles, CA (US); Isaac Cheah, Los Angeles, CA (US); Brandon Foster, Los Angeles, CA (US)

(73) Assignee: Tung Inc., Los Angeles, CA (US)

( * ) Notice: Subject to any disclaimer, the term of this patent is extended or adjusted under 35 U.S.C. 154(b) by 0 days.

(21) Appl. No.: 14/822,106

(22) Filed: Aug. 10, 2015

(65) Prior Publication Data

US 2015/0356603 A1  Dec. 10, 2015

Related U.S. Application Data

(63) Continuation-in-part of application No. 14/077,687, filed on Nov. 12, 2013, now Pat. No. 9,262,774.

(51) Int. Cl.
| | |
|---|---|
| *G06Q 30/02* | (2012.01) |
| *G06F 3/16* | (2006.01) |
| *G06F 3/0481* | (2013.01) |
| *G06F 3/0484* | (2013.01) |
| *G06F 3/0482* | (2013.01) |
| *H04M 1/725* | (2006.01) |
| *H04W 4/18* | (2009.01) |

(52) U.S. Cl.
CPC ......... *G06Q 30/0257* (2013.01); *G06F 3/0482* (2013.01); *G06F 3/04817* (2013.01); *G06F 3/04842* (2013.01); *G06F 3/16* (2013.01); *G06Q 30/0255* (2013.01); *G06Q 30/0261* (2013.01); *G06Q 30/0267* (2013.01); *H04M 1/72525* (2013.01); *H04M 1/72552* (2013.01); *H04W 4/18* (2013.01); *H04M 1/72555* (2013.01)

(58) Field of Classification Search
CPC ............... G06F 17/30253; G06Q 30/0255; H04M 1/72552; H04M 1/72555; H04W 4/18
See application file for complete search history.

(56) References Cited

U.S. PATENT DOCUMENTS

| | | | | |
|---|---|---|---|---|
| 5,761,689 A * | 6/1998 | Rayson | ................. | G06F 17/273 715/210 |
| 5,802,534 A * | 9/1998 | Hatayama | ............... | G06F 17/24 715/205 |
| 8,701,032 B1 * | 4/2014 | Zhai | .................... | G06F 3/04886 715/773 |
| 2003/0023451 A1 * | 1/2003 | Willner | ............... | G06F 21/6245 713/151 |
| 2008/0071612 A1 * | 3/2008 | Mah | ....................... | G06Q 30/02 705/14.73 |
| 2012/0089669 A1 * | 4/2012 | Berg | ..................... | H04J 3/0667 709/203 |
| 2013/0159431 A1 * | 6/2013 | Berry | ..................... | H04L 51/08 709/206 |

* cited by examiner

*Primary Examiner* — William Spieler (57) ABSTRACT

Described herein are methods and systems allowing a company to market and advertise its brands, products and/or services in a mobile platform by use of an application converting a user input into a corresponding branded icon, logo or image and displaying the same. The user input is in the form of a text entry from the device keyboard, e.g., a brand name or a generic search word, or a voice or sound input or audio demand from the device speaker. By providing various menu functions associated with the displayed icons, logos or images, the application combines mobile texting with online search or browsing to provide for a much simpler and more convenient mobile experience.

24 Claims, 10 Drawing Sheets

CONVERSION AND DISPLAY OF A USER INPUT

CROSS REFERENCE TO RELATED APPLICATION

This application is a continuation-in-part application of the U.S. patent application Ser. No. 14/077,687, filed on Nov. 12, 2013, entitled "Methods and Systems for Converting and Displaying Company Logos and Brands," which is hereby incorporated by reference in its entirety.

FIELD OF THE INVENTION

The present invention relates generally to enhancing digital marketing in mobile devices, and more particularly, to methods and systems automatically converting a user input into a corresponding branded icon, logo or image and displaying the same in mobile communication applications.

BACKGROUND

With the popular use of mobile devices (e.g., smart phones, cell phones, tablets, etc.), today's digital environment has profoundly changed: more and more people use mobile devices rather than web-based computers to quickly search, retrieve, view and share information with their friends and contacts in a global scale. Particularly, the proliferation of various mobile communication applications, such as SMS/Text, MMS, Instant Messaging (IM), iMessage, Blackberry Message, Samsung ChatOn, Facebook Message, Twitter, WhatsApp, Skype, WeChat, and so forth, allows people to contact and communicate with their friends and contacts at any time and from anywhere. When people text each other using any of these applications, it is customary practice to shorten certain words and/or use emotional icons or images in their messages. In fact, most of these applications provide built-in "emoticons" for users to choose and insert in their text messages, although the available "emoticons" might be limited depending on specific configurations of these applications.

In view of the ever-changing digital environment, many companies have increasingly adopted mobile devices and applications installed therein as another marketing and advertising platform, in addition to conventional media such as newspaper, billboards, TV, radio, online search engine (e.g., Google) and websites accessible through computers linked to the Internet. For example, companies may specially create a mobile version of their advertisements (e.g., commercial banners) to be displayed at the edge or in the corner of a smart phone screen upon activation of certain applications in mobile devices. However, unlike conventional media such as newspaper, billboards, TV and web pages, most mobile devices, such as iPhone and Android phones, have very limited display space for displaying advertisements. As a result, oftentimes people find those advertisements distractive and even offensive for blocking or interfering with their viewing of digital contents in mobile devices.

Therefore, a need exists for adverting and marketing companies' brands, products and services in the mobile platform in an easy, effective and non-intrusive manner. On the other hand, there is conceivable benefit for mobile device users if company logos can be used, displayed or otherwise incorporated seaminglessly in mobile communication applications, similar to "emoticons," for immediate visual attention.

SUMMARY OF THE INVENTION

The presently disclosed embodiments are directed to solving issues relating to one or more of the problems presented in the prior art, as well as providing additional features that will become readily apparent by reference to the following detailed description when taken in conjunction with the accompanying drawings.

One embodiment is directed to a method for converting and displaying a user input in a mobile device, comprising: receiving a user input in a mobile communication application; determining whether said user input corresponds to one or more pre-defined image entries, each image entry comprising a branded icon or logo, and if so, displaying said pre-defined image entries corresponding to said user input; receiving a user selection of at least one of said pre-defined image entries; and in response to said user selection, displaying said at least one of said pre-defined image entries to replace said user input.

In one embodiment, the method comprises a further step of displaying one or more menu functions associated with said pre-defined image entries corresponding to said user input. One embodiment of the method comprises a further step of displaying said one or more pre-defined image entries in a particular order. Another embodiment of the method further comprises creating a database storing correlation entries of keywords and pre-defined image entries, each correlation entry comprising a keyword and one or more corresponding image entries.

Another embodiment is directed to a non-transitory computer readable medium comprising executable instructions, the executable instructions, while executed, causing a processor to perform: receiving a user input in a mobile communication application; determining whether said user input corresponds to one or more pre-defined image entries, each image entry comprising a branded icon or logo, and if so, displaying said pre-defined image entries corresponding to said user input; receiving a user selection of at least one of said pre-defined image entries; and in response to said user selection, displaying said at least one of said pre-defined image entries to replace said user input.

Further features and advantages of the present disclosure, as well as the structure and operation of various embodiments of the present disclosure, are described in detail below with reference to the accompanying drawings.

BRIEF DESCRIPTION OF THE DRAWINGS

The present disclosure, in accordance with one or more various embodiments, is described in detail with reference to the following figures. The drawings are provided for purposes of illustration only and merely depict exemplary embodiments of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

DETAILED DESCRIPTION OF EXEMPLARY EMBODIMENTS

The following description is presented to enable a person of ordinary skill in the art to make and use the invention. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the invention. Thus, embodiments of the present invention are not intended to be limited to the examples described herein and shown, but is to be accorded the scope consistent with the claims.

The word "exemplary" is used herein to mean "serving as an example or illustration." Any aspect or design described herein as "exemplary" is not necessarily to be construed as preferred or advantageous over other aspects or designs.

Reference will now be made in detail to aspects of the subject technology, examples of which are illustrated in the accompanying drawings, wherein like reference numerals refer to like elements throughout.

It should be understood that the specific order or hierarchy of steps in the processes disclosed herein is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Embodiments disclosed herein are directed to methods and systems allowing a company to market and advertise its brands, products and/or services in a mobile platform by use of an application converting a user input into a corresponding branded icon, logo or image and displaying the same.

Particularly, this application receives a user input in a mobile communication application, such as SMS/text, IM, iMessage, and any social networking application, for example, Facebook and Twitter, and displays one or more branded icons, logos or images corresponding to the user input for a user to select. In displaying multiple icons, logos or images corresponding to the user input, one embodiment of the application sorts the displayed icons, logos or images in a pre-defined order, for example, alphabetically according to the user input.

In one embodiment, the user input received in the application is in the form of a text entry from the device keyboard, e.g., a brand name or a generic search word, or a voice or sound input or audio demand from the device speaker. In another embodiment, the displayed icons, logos or images can be 3D animated, or even encompass a video clip.

Other embodiments of the application also provide various menu functions associated with the displayed icons, logos or images, such as map and location search, online shopping, deal offering, download, use, and so forth, which combines mobile texting with online search or browsing such that a user may enjoy a much simpler and more convenient mobile experience.

As partial implementation of the methods and systems, a mobile device is provided according to one embodiment of the present invention. Specifically, the processor in the device is configured to receive a user input in a mobile communication application, determine whether said user input is associated with any branded icon, logo or image, and upon the determination that said user input is associated with a particular branded icon, logo or image, display said particular branded icon, logo or image and associated menu functions in said mobile communication application.

It should be appreciated that the embodiments described herein are illustrated by referring to currently-prevalent text and messaging applications such as SMS, MMS, IM, iMessage, Samsung ChatOn, Facebook, Twitter, WhatsApp, Skype, WeChat, etc., the application of these embodiments are not so limited, but can include any type of existing or future social network platforms that people may adopt in view of the continuous evolvement of technologies.

Figure 1:
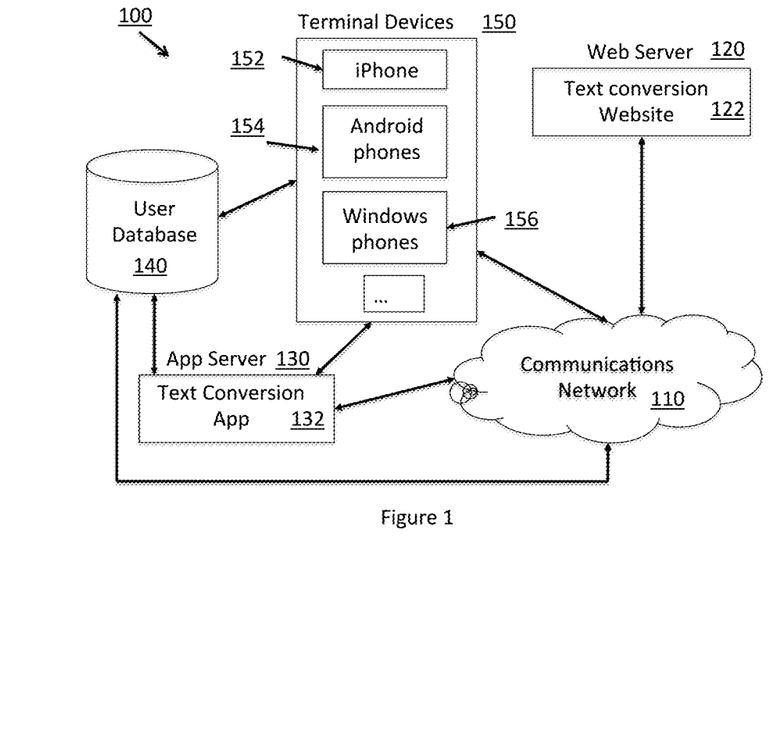
FIG. 1 is a high-level overview of an exemplary system in which embodiments of the invention can be implemented.

Referring to FIG. 1, illustrated therein is a high-level overview of an exemplary system 100 in which embodiments of the invention can be implemented. As shown in FIG. 1, the system 100 comprises a communications network 110 and a few entities connected to the network, including one or more web servers 120, one or more application servers 130, a user database 140 and one or more terminal devices 150.

The communication network 110 can be one or a combination of the following networks: the Internet, Ethernet, a mobile carrier's core network (e.g., AT&T or Verizon networks), a Public Switched Telephone Network (PSTN), a Radio Access Network (RAN), and any other wired or wireless networks.

The web server 120 is configured to host a website or web-based application 122 (e.g., a text conversion website) for company users to register and enter their logo information, for example, entries correlating certain keywords with their brands, branded icons, logos or images. Preferably, the application 122 is configured to provide a website accessible over the Internet. Alternatively, it can also be embodied in a mobile form, e.g., capable of being downloaded and installed in a mobile device. All the company information, such as the company address, account, contact and payment, and all related logo data can be stored in the user database 140, as with end user data, or in separate databases that are connected to the network 110 and accessible to the web server 120.

The application server 130 is configured with computer software, executable programs, algorithms, functional modules and processes, such as the application 132 (e.g., the text conversion app) for converting a user input into corresponding branded icons, logos or images. The application 132 is configured to not only display the branded icons, logos or images corresponding to the user input, but also provide various menu functions allowing a user to select and search for brand-related information, conduct an online search for branded products and services, etc., as will be described in detail below. The application 132 can be downloaded and installed in any mobile device from a website, an App Store typical of iPhones, or any application utility provided by Android phones, Windows phones or any other mobile devices. In practice, various versions and updates of the application 132 can be provided in order to be compatible with different mobile operating systems such as Apple iOS, Android or Windows. Once the application 132 is downloaded and installed in a user's mobile device, the device is able to interact with the application server 130 in providing the function of converting words into logos.

Upon authorization of registered users of the application 132, the application server 130 is also capable of storing user information in the user database 140 and accessing the same, whenever needed, to compile user reports for company users. For example, the user information in the user database 140 can include the user's current location, search history, name, age, gender, date of birth, home address, occupation, ethnicity, phone number, email, etc. When a registered user is using the application 132 through her/his terminal device, the user data can be collected and recorded in the database 140 on a real-time basis. In an alternative embodiment, the application 132 and the application server 130 can back up user data into the database 140 on a regular basis, for example, every thirty minutes or every business day.

As illustrated in FIG. 1, terminal devices or mobile devices 150 comprise various smart phones such as iPhone 152, Android phones 154, Windows phones 156. However, the devices 150 are not so limited, but may include many other network devices, including a fixed or mobile subscriber unit, a pager, a cellular telephone, a personal digital assistant (PDA), a smart phone, a laptop, a netbook, a tablet computer, a personal computer, a wireless sensor, consumer electronic devices, and the like.

It should be appreciated that the system 100 in FIG. 1 is for illustration only and can be implemented with many variations without departing from the spirit of the invention. For instance, the web server 120 and application server 130 each can include multiple computers and stations distributed in different locations.

Figure 2:
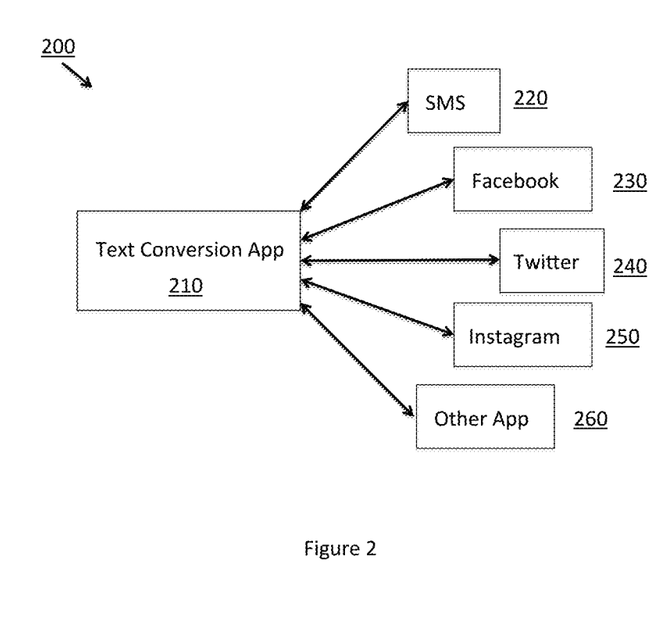
FIG. 2 illustrates exemplary web-based as well as mobile applications in which embodiments of the invention can be implemented.

FIG. 2 shows exemplary web-based as well as mobile applications in which embodiments of the invention can be implemented. For example, when the application 210 is enabled in the user's mobile device, it allows for a conversion of a user input (e.g., a text entry) into corresponding branded icons, logos or images for display in mobile communication applications including various texting/messaging applications such as SMS 220, and social networking applications such as Facebook 230, Twitter 240 and Instagram 250 and many other applications 260 capable of sending and receiving communications. It should be understood that the applications in FIG. 2 are for illustration only, and the applicability of embodiments of the invention is not limited, but can include any application installed and ready to use in the user's mobile device.

Figure 3A:
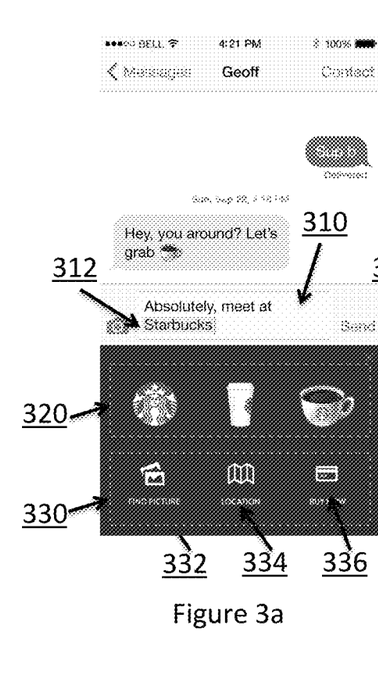
FIGS. 3a-f illustrate exemplary screen shots of a mobile application for converting a user input into a corresponding branded icon, logo or image according to embodiments of the invention.
Figure 3B:
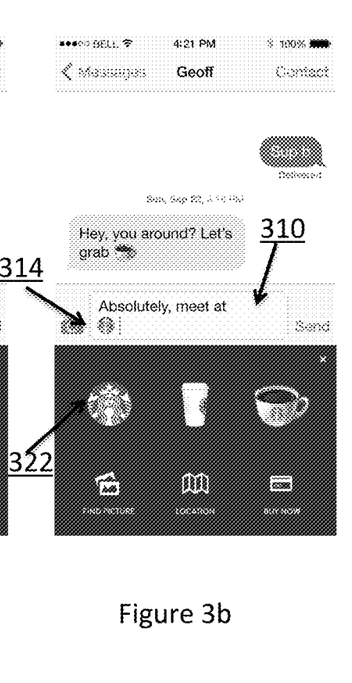

Turning to the exemplary screen shots in FIGS. 3a-f, a mobile application as illustrated in FIG. 2 for converting a user input into a corresponding branded icon, logo or image will be described. As demonstrated in FIG. 3a, when a text entry 310 (e.g., "Absolutely, meet at Starbucks") is received, the application determines if the text entry 310 contains any keyword or pre-defined term 312 that corresponds to one or more branded icons, logos or images. This word or term 312 can be a brand name or trademark word, for example, "Starbucks" as shown in FIG. 3a, or a generic search word, such as "coffee," which may be pre-defined to correspond to a number of coffee brands, e.g., Starbucks, Coffee Bean & Tea Leaf, etc. Once such a keyword or pre-defined term 312 is identified, the application automatically displays one or more corresponding icons, images or logos 320, from which the user can select one to replace the word or term 312 in the text entry 310. For instance, as shown in FIG. 3b, if the user selects the logo image 322 to replace the term "Starbucks," the corresponding icon 314 will be displayed in the text entry 310.

Back to FIG. 3a, in addition to displaying one or more branded icons, images or logos 320 corresponding to the user input, the application also provides various menu functions 330 associated with the displayed brand, such as a menu function 332 "Find Picture" for finding related logo pictures, a menu function 334 "Location" for navigating or locating a brand store in the map, a menu function 336 "Buy Now" for purchasing branded products and/or services, and many other possible functions (not shown).

Figure 3C:
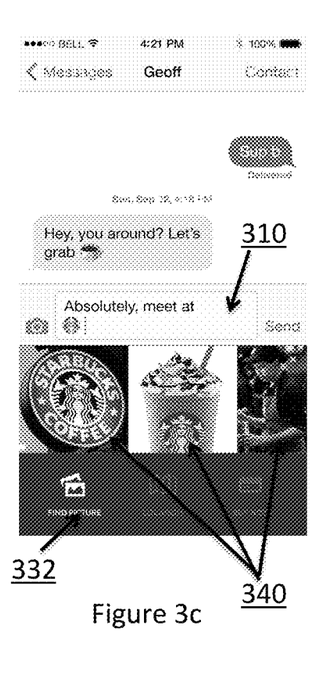
Figure 3D:
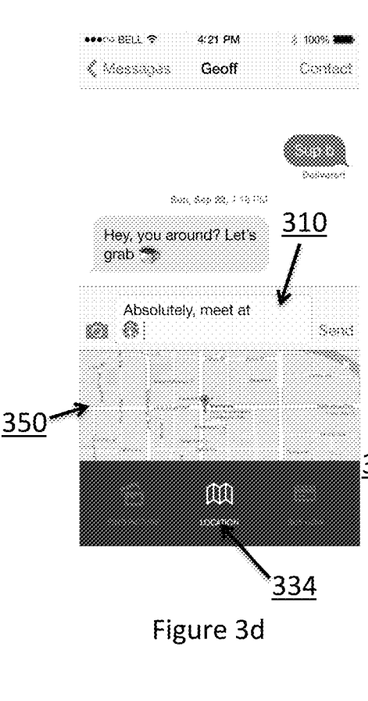
Figure 3E:
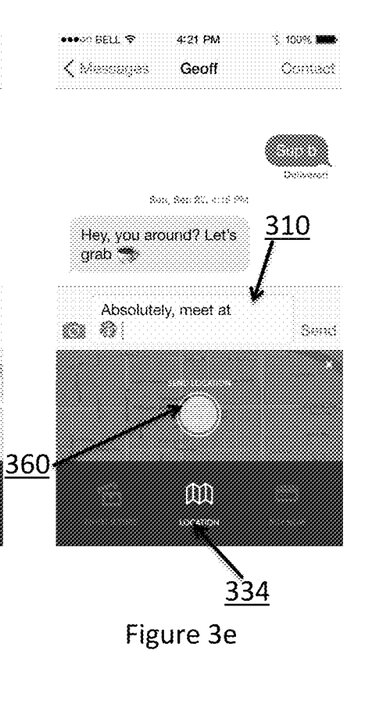
Figure 3F:
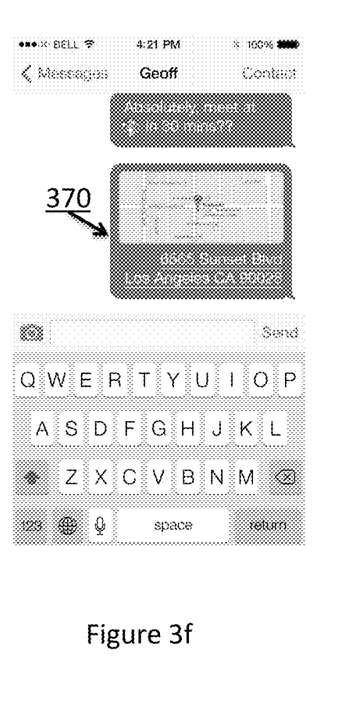

As shown in FIG. 3c, if a user clicks or touches on the menu function 332 "Find Picture," the application will display product pictures of the "Starbucks" brand so that the user can further select for a display in the text entry 310. Or if the user selects (by clicking or touching on) the menu function 334 "Location" as illustrated in FIG. 3d, the application will display a store location for "Starbucks" in the map 350. For example, the application may allow the user to "Find the nearest Starbucks" or to "Find the nearest coffee shop." Furthermore, the user can use the "send the location" function 360 in FIG. 3e. As a result of doing so, the user can send a location message 370, as illustrated in FIG. 3f.

It should be appreciated that FIGS. 3a-f are for illustration only, and many variations can be implemented as to how to display the branded icons, logos and images for the user selection. In addition, many other features and functionalities can be implemented according to alternative embodiments of the invention. For example, in one embodiment, the user input received by the application may be in the form of a voice or speech demand, and without converting the voice/speech input into texts or words, the application can directly convert it into one or more corresponding branded icons, logos or images for display. In another embodiment, the displayed icons, logos or images (e.g., all the Starbucks logos 320 in FIGS. 3a-b) can comprise not only 2D images, but also 3D animations, audio and video clips, and many other multi-media forms. Also, the menu functions of the application are not limited to the demonstrations in FIGS. 3a-f, and can include many more customized services, such as directing the user to the original website of the brand for further browsing and shopping, allowing the user to transfer money or perform online banking, recommending related products and services, and so forth.

Figure 4A:
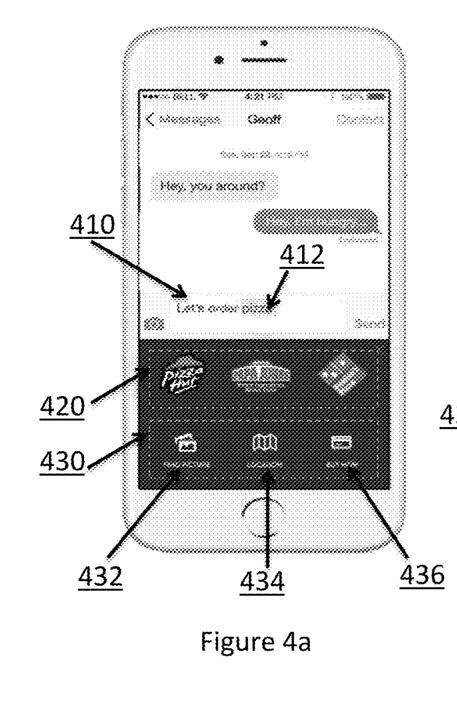
FIGS. 4*a-b* illustrate exemplary screen shots of additional features of the mobile application in FIGS. 3*a-f* according to embodiments of the invention.
Figure 4B:
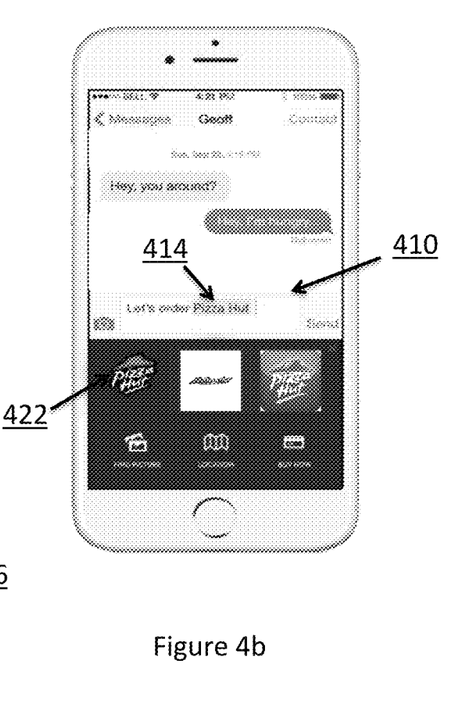

FIGS. 4a-b illustrate some additional features of the above-described mobile application according to various embodiments of the invention. As shown in FIG. 4a, when the user types a generic word 412, e.g., "Pizza," in the text entry 410 "Let's order Pizza," the application intelligently detects the word 412 and determines this word is associated with a number of pizza company brands. As such, the application displays the logos, icons and images of all related pizza brands 420, for example, "Pizza Hut," "Papa Johns" and "Dominos," for the user to choose. In one embodiment, the logos, icons or branded images are displayed in a paid-for advertising order, analogous to the search results via Google AdWord. Similar to the functions in FIGS. 3a-f, the application also displays a number of menu functions 430, such as "Find Picture" 432, "Location" 434 and "Buy Now" 436. However, rather than choose a displayed icon or logo, the user may continue to type and finish the word "Pizza Hut" 414, as demonstrated in FIG. 4b. In this case, upon detection of the word change, the application automatically eliminates other company icons, logos or brand images and only displays those corresponding to the brand "Pizza Hut." Then the user can select a particular logo image, for example, the logo 422, to replace the word entry 414.

Figure 5:
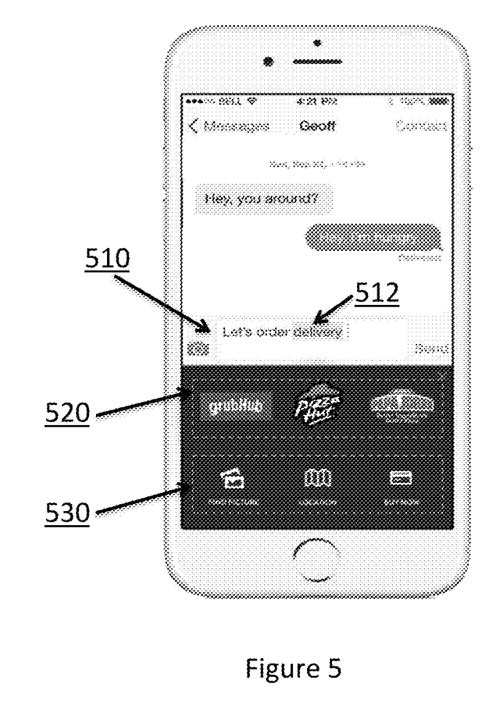
FIG. 5 is an exemplary screen shot of additional features of the mobile application in FIGS. 3*a-f* according to embodiments of the invention.

FIG. 5 demonstrates another feature of the above-described mobile application according to embodiments of the invention. As shown in FIG. 5, the application receives a text entry 510 ("Let's order delivery") that contains a pre-defined word or term 512 "delivery." Once the application determines that this term "delivery," as predefined by company users, is associated with multiple branded icons, logos or images, these icons, logos or images 520 will be displayed for the user to choose. Additionally, associated menu functions 530 will also be displayed.

Figure 6A:
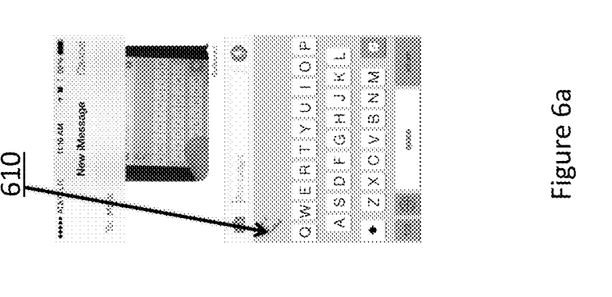
FIGS. 6*a-g* illustrate exemplary screen shots of additional features of the mobile application in FIGS. 3*a-f* according to embodiments of the invention.
Figure 6B:
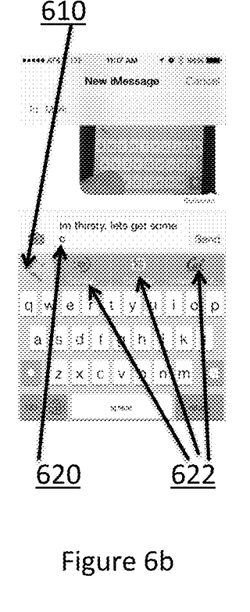
Figure 6C:
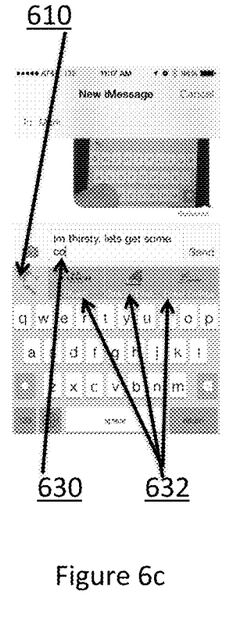
Figure 6D:
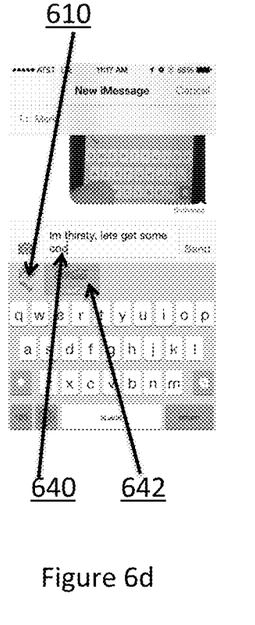
Figure 6E:
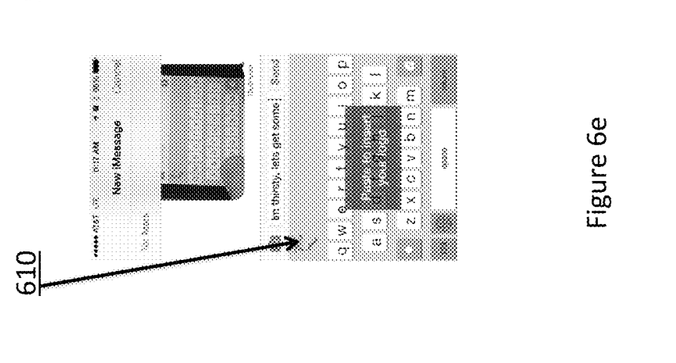
Figure 6F:
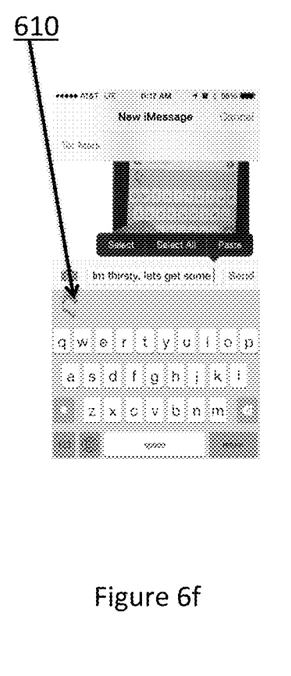
Figure 6G:
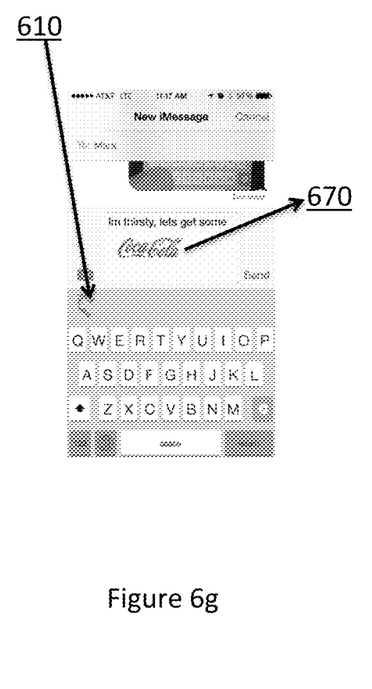

Another unique and user-friendly feature of the above-described mobile application will be described with reference to the exemplary screen shots in FIGS. 6a-g. As shown in FIG. 6a, when the application is activated, for example, as indicated by the icon 610 on the key bar, a user can type any word in the text entry box. If the user types a letter "c" 620 as shown in FIG. 6b, all the icon or logo images 622 corresponding to words containing "c" will appear on the key bar and in an alphabetical order. The key bar can be scrolled from left to right to present more logo images. If the user keeps typing the letter "o" and the word now becomes "co" 630, as shown in FIG. 6c, only the icon or logo images 632 that correspond to the words containing "co" will remain on the key bar alphabetically. Similarly, as shown in FIG. 6d, when the user continues to type and the word becomes "coc" 640, then the application will filter out more images to only leave the image corresponding to words containing "coc," for example, the "Coca-Cola" logo image 642. At this time, one embodiment of the application allows the user to select the image 642 by tapping on it, and once the image is tapped, the word "coc" may be deleted from the text entry, and as shown in FIG. 6e, the application presents an alert message for the user to paste the selected or tapped image into the text. In FIG. 6f, the user can use existing keyboard functions like "select" and "paste" to insert the logo image. As a result, the logo image 670 is inserted in the text entry as shown in FIG. 6g.

It should be appreciated that FIGS. 6a-g are for illustration only, and many variations can be implemented as to how to display the branded icons, logos and images for the user selection. In addition, many other features and functionalities can be implemented according to alternative embodiments of the invention. For example, the user may select an icon or logo image through other actions rather than tapping or pressing the image.

In one embodiment, the icon or logo image is associated with a sound file so that when the user selects the image (e.g., by tapping or pressing the image), the sound file will be played. As an example, the "Coca-Cola" image can be associated with a sound file that plays a brand slogan such as "share a coke." So when the user presses or taps on the "Coca-Cola" image, the sound "share a coke" will be played. Also, after the user sends the text message with an icon or logo image inserted therein, the message recipient can use the inserted image in a similar manner, for example, by cutting and pasting the inserted image in his own text entry, or pressing the inserted image to play the sound file.

Another embodiment of the present invention relates to stenographic message encryption. In this embodiment, the user can enable a particular operating mode, for example, so-called "undercover mode" in which the user writes and sends an image message to a recipient. Then the recipient, upon receiving the image message, can also enable the "undercover mode" to read the text message embedded in the image. In one configuration, the "undercover mode" can be activated or verified through a user touch ID. The images with embedded text messages are pre-created or generic. Or users can create their own images with text messages embedded in them.

Figure 7:
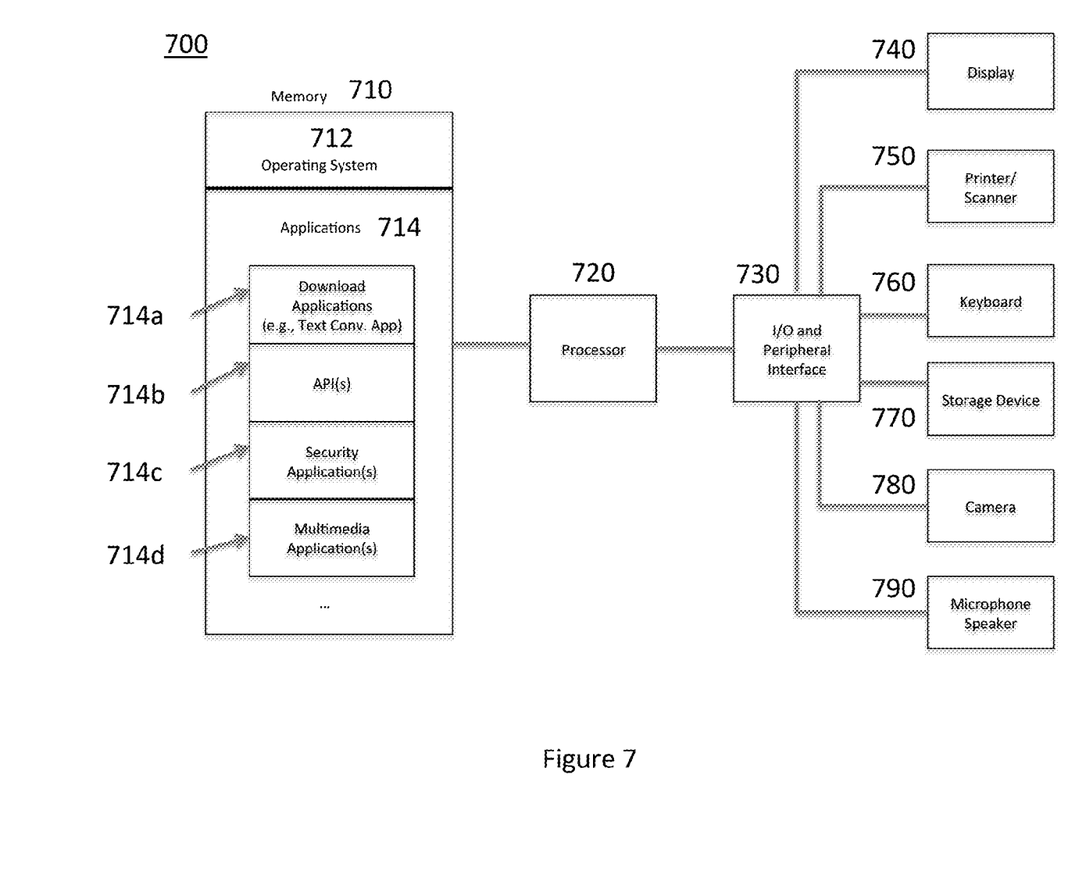
FIG. 7 is a simplified functional block diagram of an exemplary computer that can be implemented in the exemplary system of FIG. 1.

FIG. 7 is a simplified functional block diagram of an exemplary computer programmed or configured to implement embodiments of the invention. This exemplary computer 700 can also be implemented as the web server 120 or the application server 130 in the exemplary system of FIG. 1. It should be noted that the computer 700 is for illustration only, and many computer components included therein may not be shown or described in the following paragraphs.

As shown in FIG. 7, the computer 700 comprises a memory 710, a processor 720 capable of accessing the memory 710, and one or more I/O interfaces or other peripheral interfaces 730 coupled to the processor 720. Exemplary external or peripheral devices include, without limitation, a display 740, a keyboard 760, a camera 780, a printer or scanner in a combined or separate form 750, a storage device 770 such as a USB or disk, and a microphone or speaker 790. The memory 710 includes software programs or drivers for activating and communicating with each peripheral device. In one configuration, these components are connected through one or more communication buses (not shown) in the computer, which may include circuitry that interconnects and controls communications between different components.

The memory 710 includes high-speed random access memory, such as DRAM, SRAM, DDR RAM and/or other random access solid state memory devices; and includes non-volatile memory, such as flash memory devices, a magnetic disk storage device, and/or other non-volatile solid state storage devices. The memory 710, or alternately non-volatile memory device(s) within the memory 710, includes a non-transitory computer-readable storage medium. While the memory 710 is shown as being separate from the processor 720, all or a portion of the memory 710 may be embedded in the processor 520. In some embodiments, the memory 710 stores the following programs, modules and data structures, or a subset thereof: an operating system 712 that includes procedures for handling various basic system services and for performing hardware dependent tasks, and applications 514, including one or more downloaded user applications 714a and corresponding APIs 714b for processing data received from other devices and data to be transmitted to the other devices, security applications 714c, and/or multimedia applications 714d. The processor 720 is configured to access and execute the instructions, programs, applications, and modules stored in the memory 710.

Figure 8:
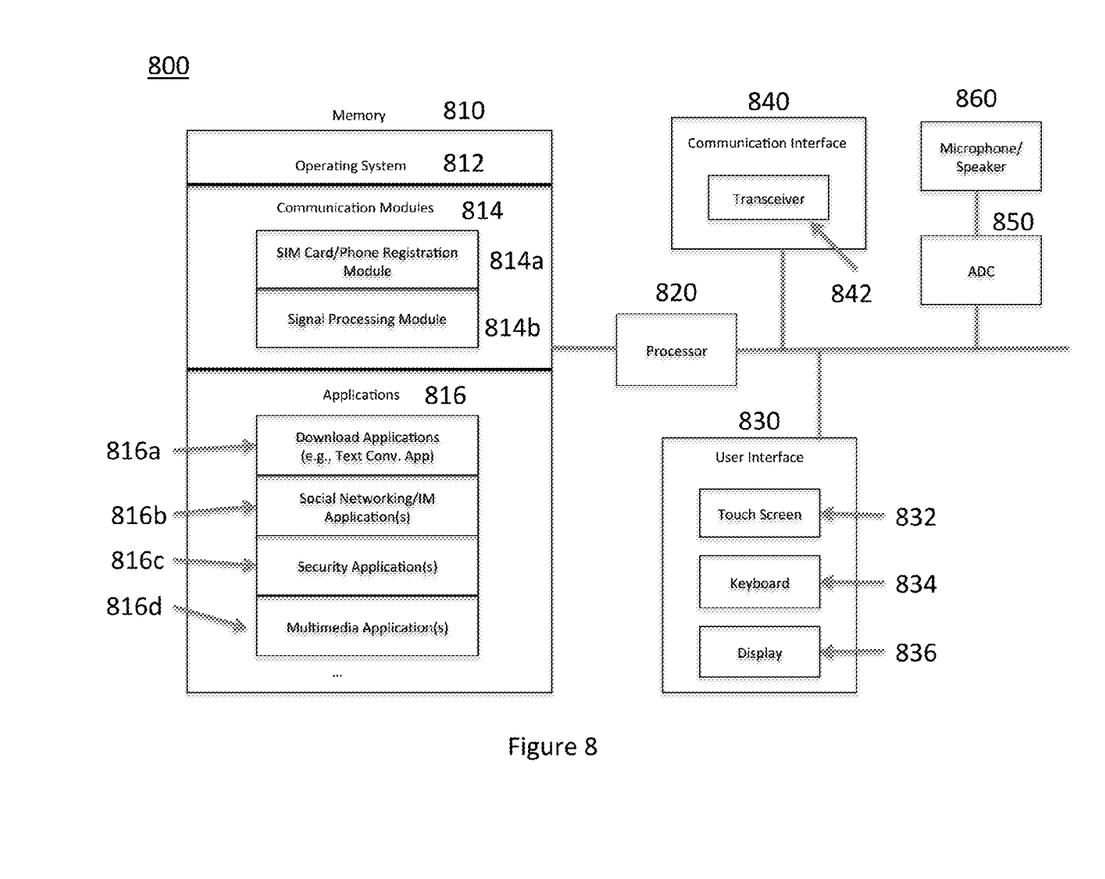
FIG. 8 is a simplified functional block diagram of an exemplary mobile device that can be implemented in the exemplary system of FIG. 1.

FIG. 8 is a simplified functional block diagram of an exemplary mobile device programmed or configured to implement embodiments of the invention. This exemplary mobile device 800 can also be implemented in the exemplary system of FIG. 1 for users to connect to the network and different application servers in the network. It should be noted that the device 800 is for illustration only, and many device components included therein may not be shown or described in the following paragraphs.

As shown in FIG. 8, the exemplary device 800 comprises a memory 810, a processor 820 capable of accessing the memory 810, a user interface 830, a communication interface 840, an Analog to Digital Converter (ADC) 850 and a microphone or speaker 860 connected to the ADC. In one configuration, all device components are connected through one or more communication buses (not shown) that may include circuitry that interconnects and controls communications between different components.

The memory 810 includes high-speed random access memory, such as DRAM, SRAM, DDR RAM and/or other random access solid-state memory devices; and includes non-volatile memory, such as flash memory devices, a magnetic disk storage device, and/or other non-volatile solid-state storage devices. The memory 810, or alternately non-volatile memory device(s) within the memory 810, includes a non-transitory computer-readable storage medium. While the memory 810 is shown as being separate from the processor 820, all or a portion of the memory 810 may be embedded in the processor 820. In some embodiments, the memory 810 stores the following programs, modules and data structures, or a subset thereof: an operating system 812 that includes procedures for handling various basic system services and for performing hardware dependent tasks, communication modules 814 used for communicating with other devices or network controllers via the communications interface 840, such as a SIM card or phone registration module 814a and a signal processing module 814b, and applications 816, including one or more downloaded user applications 816a, various social network or messaging applications 816b, security applications 816c and multimedia applications 816d. All these applications may have associated API(s) (not shown) in the memory 810.

In some embodiments, the processor 820 is configured to access and execute the instructions, programs, applications, and modules stored in the memory 810. Through the user interface 830, the processor 820 is coupled to one or more of the following: a touch screen 832, a keyboard 834 and a display 836. The processor 820 is also coupled to a transceiver 842 via the communication interface 840.

While various embodiments of the invention have been described above, it should be understood that they have been presented by way of example only, and not by way of limitation. Likewise, the various diagrams may depict an example architectural or other configuration for the disclosure, which is done to aid in understanding the features and functionality that can be included in the disclosure. The disclosure is not restricted to the illustrated example architectures or configurations, but can be implemented using a variety of alternative architectures and configurations. Additionally, although the disclosure is described above in terms of various exemplary embodiments and implementations, it should be understood that the various features and functionality described in one or more of the individual embodiments are not limited in their applicability to the particular embodiment with which they are described. They instead can be applied alone or in some combination, to one or more of the other embodiments of the disclosure, whether or not such embodiments are described, and whether or not such features are presented as being a part of a described embodiment. Thus the breadth and scope of the present disclosure should not be limited by any of the above-described exemplary embodiments.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

In this document, the terms "computer program product", "computer-readable medium", and the like, may be used generally to refer to media such as, memory storage devices, or storage unit. These, and other forms of computer-readable media, may be involved in storing one or more instructions for use by processor to cause the processor to perform specified operations. Such instructions, generally referred to as "computer program code" (which may be grouped in the form of computer programs or other groupings), when executed, enable the computing system.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known", and terms of similar meaning, should not be construed as limiting the item described to a given time period, or to an item available as of a given time. But instead these terms should be read to encompass conventional, traditional, normal, or standard technologies that may be available, known now, or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to", or other like phrases in some instances shall not be read to mean that the narrower case is intended or required in instances where such broadening phrases may be absent.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements or controllers may be performed by the same processing logic element or controller. Hence, references to specific functional units are only to be seen as references to suitable means for providing the described functionality, rather than indicative of a strict logical or physical structure or organization.

Furthermore, although individually listed, a plurality of means, elements or method steps may be implemented by, for example, a single unit or processing logic element. Additionally, although individual features may be included in different claims, these may possibly be advantageously combined. The inclusion in different claims does not imply that a combination of features is not feasible and/or advantageous. Also, the inclusion of a feature in one category of claims does not imply a limitation to this category, but rather the feature may be equally applicable to other claim categories, as appropriate.

What is claimed is:

1. A method for converting and displaying a user input in a mobile device, comprising:
   receiving a user input in a mobile communication application;
   determining whether said user input corresponds to one or more pre-defined image entries, each image entry comprising a branded icon or logo, and if so, displaying said pre-defined image entries corresponding to said user input;
   receiving a user selection of at least one of said pre-defined image entries; and
   in response to said user selection, displaying said at least one of said pre-defined image entries to replace said user input.

2. The method of claim 1, wherein said user input comprises one or more keywords that are pre-defined to correspond to at least one pre-defined image entry.

3. The method of claim 2, wherein said keyword comprises a generic search term or a branded term.

4. The method of claim 1, wherein said one or more image entries comprise a 2D image, a 3D animation or a video clip.

5. The method of claim 1, wherein one of said one or more image entries is associated with a sound file to be played when the image entry is selected.

6. The method of claim 1, wherein one of said one or more image entries is embedded with a text message, and wherein said embedded text message is generic or pre-created by a user.

7. The method of claim 1, further comprising:
   displaying one or more menu functions associated with said pre-defined image entries corresponding to said user input.

8. The method of claim 7, wherein said one or more menu functions comprise a map function displaying a location associated with said pre-defined image entries.

9. The method of claim 7, wherein said one or more menu functions comprise an online shopping function associated with said pre-defined image entries.

10. The method of claim 1, further comprising displaying said one or more pre-defined image entries alphabetically.

11. The method of claim 1, further comprising creating a database storing correlation entries of keywords and pre-defined image entries, each correlation entry comprising a keyword and one or more corresponding image entries.

12. The method of claim 1, further comprising:
   receiving an update on said user input;
   in response to the updated user input, updating the displayed image entries by automatically filtering out image entries that do not correspond to the updated user input; and
   displaying the updated image entries alphabetically.

13. A non-transitory computer readable medium comprising executable instructions, the executable instructions, while executed, causing a processor to perform:
   receiving a user input in a mobile communication application;
   determining whether said user input corresponds to one or more pre-defined image entries, each image entry comprising a branded icon or logo, and if so, displaying said pre-defined image entries corresponding to said user input;
   receiving a user selection of at least one of said pre-defined image entries; and
   in response to said user selection, displaying said at least one of said pre-defined image entries to replace said user input.

14. The non-transitory computer readable medium of claim 13, wherein said user input comprises one or more keywords that are pre-defined to correspond to at least one pre-defined image entry.

15. The non-transitory computer readable medium of claim 14, wherein said keyword comprises a generic search term or a branded term.

16. The non-transitory computer readable medium of claim 13, wherein said one or more image entries is a 2D image, a 3D animation or a video clip.

17. The non-transitory computer readable medium of claim 13, wherein at least one of said one or more image entries is associated with a sound file to be played when the image entry is selected.

18. The non-transitory computer readable medium of claim 13, one of said one or more image entries is embedded with a text message, and wherein said embedded text message is generic or pre-created by a user.

19. The non-transitory computer readable medium of claim 13, wherein the executable instructions, while executed, cause a processor to further perform displaying one or more menu functions associated with said pre-defined image entries corresponding to said user input.

20. The non-transitory computer readable medium of claim 19, wherein said one or more menu functions comprise a map function displaying a location associated with said pre-defined image entries.

21. The non-transitory computer readable medium of claim 19, wherein said one or more menu functions comprise an online shopping function associated with said pre-defined image entries.

22. The non-transitory computer readable medium of claim 13, wherein the executable instructions, while executed, cause a processor to further perform displaying said one or more pre-defined image entries alphabetically.

23. The non-transitory computer readable medium of claim 13, wherein the executable instructions, while executed, cause a processor to further perform creating a database storing correlation entries of keywords and pre-defined image entries, each correlation entry comprising a keyword and one or more corresponding image entries.

24. The non-transitory computer readable medium of claim 13, wherein the executable instructions, while executed, cause a processor to further perform:
   receiving an update on said user input;
   in response to the updated user input, updating the displayed image entries by automatically filtering out image entries that do not correspond to the updated user input; and displaying the updated image entries alphabetically.

* * * * *